United States Patent [19]

Long

[11] Patent Number: 4,903,882
[45] Date of Patent: Feb. 27, 1990

[54] DRIVING TOOL FOR AN ELECTRICAL STAPLE

[76] Inventor: Gregory T. Long, Box 21, Star Rte. 2, Tionesta, Pa. 16353

[21] Appl. No.: 143,300

[22] Filed: Jan. 7, 1988

Related U.S. Application Data

[63] Continuation of Ser. No. 837,842, Mar. 10, 1986, abandoned.

[51] Int. Cl.$^4$ .............................................. B25C 7/00
[52] U.S. Cl. .................................... 227/147; 29/275; 227/156
[58] Field of Search ............... 227/147, 113, 156, 109; 29/432, 275; 81/177.1, 23, 24; 30/168, 358

[56] References Cited

U.S. PATENT DOCUMENTS

| | | | |
|---|---|---|---|
| 913,014 | 2/1909 | Kafer | 227/147 |
| 1,087,092 | 2/1914 | Stingle | 227/147 |
| 2,330,575 | 9/1943 | Grauding | 227/47 |
| 2,558,242 | 6/1951 | Ernst | 30/168 |
| 4,054,237 | 10/1977 | Rietveld | 227/147 |
| 4,299,021 | 11/1981 | Williams | 29/432 |

Primary Examiner—Hien H. Phan
Attorney, Agent, or Firm—Walter J. Blenko, Jr.; Suzanne Kikel

[57] ABSTRACT

A tool for driving electrical staples and the like, to support nonmetallic wiring, which prevents the staple from clamping the cable and possibly damaging the insulation. The tool comprises a body portion which has a recessed passage formed at one end of its longitudinal axis. The recessed passage is shaped and sized to receive an electrical staple and completely surround a typical electrical conductor without touching it. The recessed passage also incorporates a staple-engaging member and a magnet to secure a staple within the recessed passage of the tool while the staple is being hammered into a building structure.

6 Claims, 2 Drawing Sheets

DRIVING TOOL FOR AN ELECTRICAL STAPLE

This is a continuation of application Ser. No. 837,842, filed Mar. 10, 1986 which is now abandoned.

This invention relates to a tool for driving electrical staples to support nonmetallic wiring against a building structure. More particularly, this invention relates to a tool for driving electrical staples to support nonmetallic wiring which prevents the staple from clamping the cable and possibly damaging the insulation.

The installation of electrical cable in a building involves the positioning of the cable on a rafter, joist, or stud and securing it with an electrical staple to prevent the cable from moving out of position. Frequently, the cable must be located in awkward places making it difficult, if not impossible, to properly hammer the staple in place. In hammering a staple it is important that the staple not be driven so deep as to cut insulation. Although various devices have been proposed for driving electrical staples, each has various shortcomings.

Potential hazards exist when electrical wiring is improperly installed. If a staple is inadvertently driven through the insulation of an electrical conductor, rather than around it, there is a danger than the staple may contact the live conductor causing the staple itself to become energized with an electrical charge. A person then touching the exposed portion of the staple could receive an electrical shock if another portion of his body is contacting a grounded object.

Even if a staple completely surrounds an electrical conductor, there is a possibility that the staple will be driven too deeply into the building causing the staple to cut through vital insulation and expose or short circuit live electrical conductors. That also poses the possibility of shock to a person who may inadvertently touch the bare conductor or staple. Also, in the communications industry, the driving of a staple point through the sheath of a coaxial cable can impair or render it totally useless.

There remains, therefore, a need for a staple-driving tool which is simple, inexpensive, but yet effective in overcoming the above-cited problems.

A variety of staple-driving tools have been developed in the past. U.S. Pat. No. 913,014 discloses a staple driver which incorporates a body member through which a longitudinally positioned passage is formed. A slidably engaged driver is inserted in the passage and used to urge staples into a structure or the like. U.S. Pat. No. 1,087,092 discloses a hammer-shaped staple holder with a rounded recess which is designed to conform to the contour of the crown of the staple. U.S. Pat. No. 4,054,237 discloses a nail setting tool which includes an adjustable means for altering the depth in which a nail may be driven. U.S. Pat. No. 4,299,021 discloses an axial impact tool for driving nails or staples which includes an elongated guide tube and a slidably engaged, elongated impact rod. The guide tube and impact rod each are made up of two or more integral parts for purposes of portability and for lengthening or shortening the device as conditions warrant.

I provide a staple-driving tool which is designed to drive a staple into wooden structures, such as rafters, studs, joists or the like. I further provide a staple-driving tool which employs no moving parts and incorporates a uniquely shaped recessed passage which causes a predetermined portion of the staple to remain above the surface through which the staple is being driven. That prevents the staple from excessively engaging the electrical conductor which it is supporting. Further, I provide a staple-driving tool with a recessed passage which is shaped not only to prevent a staple from engaging a conductor, but also, to prevent any portion of the staple-driving tool from contacting that conductor. Alternatively, I may provide a staple-driving tool which, in addition to the above-described construction, is bent along its longitudinal axis to facilitate maneuvering the tool into areas which would not be easily accessible by a staple-driving tool which is substantially straight.

Other details, objects, and advantages of my invention will become more apparent as the following description of a present preferred embodiment thereof proceeds.

In the accompanying drawings, I have illustrated certain present preferred embodiments of my invention in which.

Figure 1:
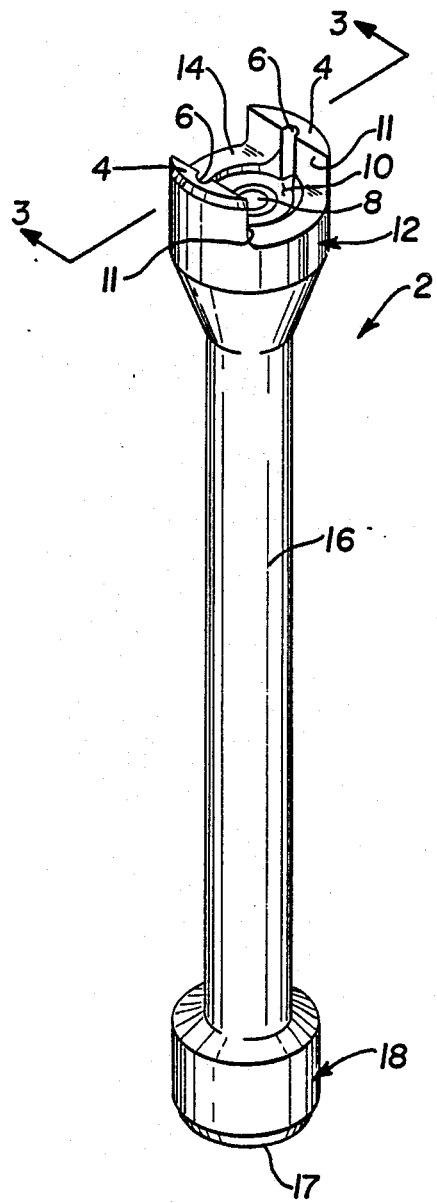
FIG. 1 is a perspective view of one form of my staple-driving tool.
Figure 2:
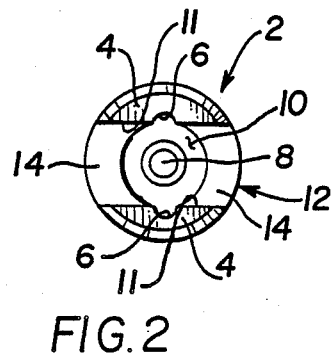
FIG. 2 is an end view of the staple-driving tool shown in FIG. 1.
Figure 3:
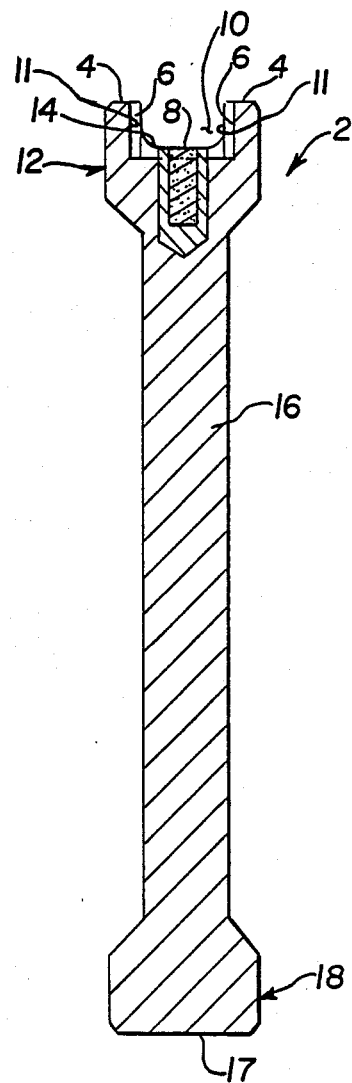
FIG. 3 is a front elevational view of the staple-driving tool of FIG. 1.

FIGS. 1-3 show one form of staple-driving tool 2. Tool 2 comprises a body 16 with enlarged body portions 18 and 12, one at each end. Enlarged body portion 18 has striking surface 17 to receive hammer blows for driving an electrical staple into wooden structures and enlarged body portion 12 includes stop surfaces 4 to limit the depth to which a staple will be driven.

Recessed passage 10 is formed in enlarged body portion 12 and is sized and shaped to surround a nonmetallic conductor without touching it. Recessed passage 10 is defined by a roof 14, two sidewalls 11, and a plane which is defined by stop surfaces 4. Magnet means 8 is centered along the longitudinal axis of tool 2 adjacent roof 14. Sidewalls 11 have formed in their surfaces staple-engaging means 6 which temporarily retain a staple within recessed passage 10.

Figure 6:
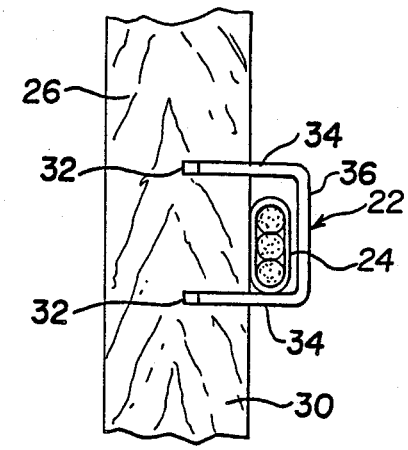
FIG. 6 is a side elevational view of a conductor which is supported in position by a staple.

It is important to note that the distance between sidewalls 11, defining the width of floor 14, is less than the width of crossbar 36 of staple 22 as shown in FIG. 6. However, the distance between the slots which define stapleengaging means 6 are approximately the width of the staple crossbar. Therefore, the placement of a staple within recessed passage 10 requires that prongs 34 of the staple be inserted within the slots of the staple-engaging means. Because of the size of the shape of the staple-engaging means, prongs 34 are in tight contact with the surfaces of the staple-engaging means 6. That prevents staple 22 from twisting out of proper alignment as it is being secured in a wooden structure.

It is also important to note that the distance between sidewalls 11 is greater than the width of a typical nonmetallic electrical conductor 24, such as Romex. Also, the separation between floor 14 and stop surfaces 4 is greater than the thickness of a typical electrical conductor. Because of that sizing and shaping of recessed passage 10, staple-driving tool 2 includes the unique property of being able to drive a staple around an electrical conductor without engaging its insulation.

Figure 4:
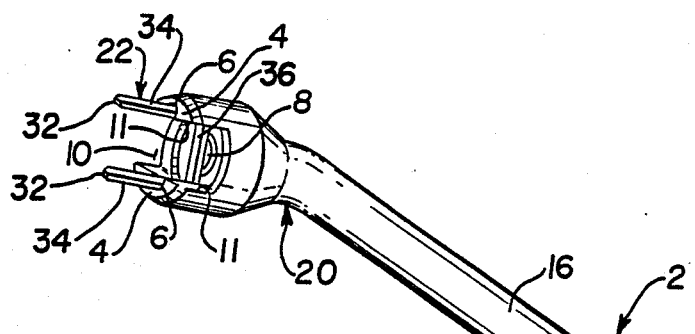
FIG. 4 is a perspective view of a different embodiment of the staple-driving tool in which a staple has been placed.
Figure 5:
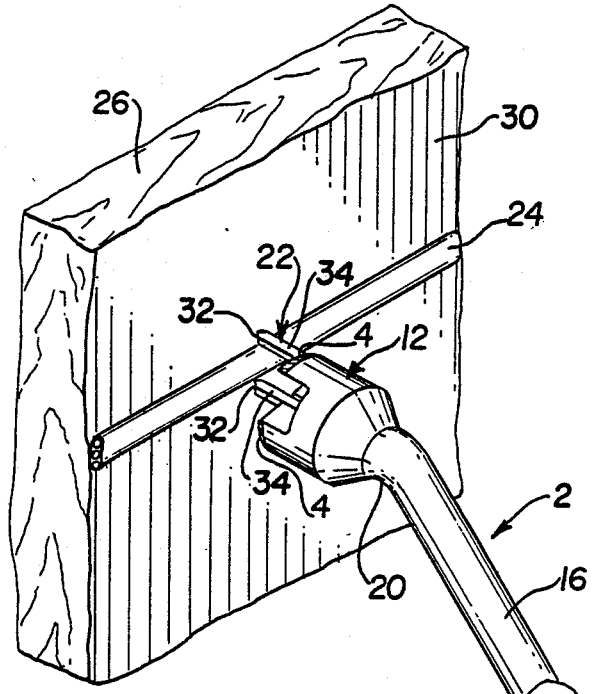
FIG. 5 is a perspective view of the staple-driving tool of FIG. 4 in juxtaposition with an installer and a wall surface.

FIGS. 4 and 5 show a different embodiment of my invention. Like numbers in those figures are used to designate like parts of those in FIGS. 1–3. That embodiment incorporates all of the features of the embodiment shown in FIGS. 1–3 and, additionally, includes bend 20 which provides an offset between the longitudinal axes of enlarged body portion 12 and the remainder of body 16. That offset aids in maneuvering tool 2 in tight locations, where a substantially straight tool would not fit, or, when driving staples into angled building members such as rafters.

FIGS. 4 and 5 also show staple 22 positioned within recessed passage 10 of tool 2. Staple 22 comprises surface-engaging edges 32 in addition to prongs 34 and crossbar 36. Additionally, FIG. 5 shows tool 2 and staple 22 held in juxtaposition with conductor 24 and structure 26, by hand 28 of the installer, just before the staple is hammered into structure 26.

FIG. 6 shows conductor 24 which is being held in place by staple 22 which has been driven to its final position. It is important to note that crossbar 36 is positioned a sufficient distance from surface 30 to prevent conductor 24 from being squeezed between those two members. That allows conductor 24 to rest on prong 34 without undue pressure being placed on the insulation of conductor 24.

When it is desired to secure an electrical conductor to a building structure the installer inserts staple 22 within recessed passage 10 of tool 2 as shown in FIG. 4. Magnet means 8 holds crossbar 36 of staple 22 in contact with roof 14 while staple-engaging means 6 prevents staple 22 from becoming misaligned with respect to sidewalls 11.

The installer then positions conductor 24 on surface 30 of structure 26. Tool 2 is then positioned by the installer so that prongs 34 of staple 22 surround, but do not touch, conductor 24 and edges 32 are in contact with surface 30 of structure 26. Hammer blows are then dealt to striking surface 17 causing edges 32 to penetrate surface 30. The hammering process continues, causing prongs 34 to enter the interior of structure 26, until stop surfaces 4 contact surface 30. At that point, staple 22 is positioned as shown in FIG. 6, with cable 24 secured in place without undue pressure being placed on the insulation of cable 24.

While I have illustrated and described certain present preferred embodiments of my invention, it is to be understood that I do not limit myself thereto and that my invention may be otherwise variously practiced within the scope of the following claims.

I claim:

1. An elongated tool for driving an electrical staple and the like into a working surface in the operation of said tool in order to mount an electrical cable-like member onto said working surface, said tool being used with an instrument for imparting a pounding force against said tool for said driving of said staple, said tool comprising:

an elongated body member having a hand gripping area and a longitudinal axis, a striking surface forming a part of said body member at one end thereof for receiving said pounding force, staple carrying means formed at the other end of said body member for carrying said staple, said staple carrying means having two opposed sidewalls, a floor surface fixedly connected to said sidewalls extending in a plane parallel to that of said floor surface for and extending there between and stop surfaces on said sidewalls limiting the depth of said staple when driven into said working surface, said sidewalls and said floor surface defining a recessed area with an open passageway extending perpendicular to said axis of said body member, and having permanently fixed, non-movable means associated with said passageway for receiving, carrying, holding, and freely allowing a release of said staple from said passageway, said open passageway extending along the entire length of said recessed area in that said recessed area is open on both sides of said staple carrying means, said open passageway further being such as to be totally open and unobstructed when receiving said staple and to remain totally open and unobstructed during said operation of said tool as to allow said recessed area and said staple in said recessed area to freely receive said cable-like member in said driving of said staple into said working surface, with said fixed, non-movable means of said recessed area being in a non-contacting relationship with said cable-like member, thereby preventing damage from occurring to said cable-like member, and whereby said staple is driven into said working surface and is released from said recessed area of said tool by moving said tool away from said working surface without any relative movement occurring between said fixed, non-movable means associated with said open passageway of said recessed area and said elongated tool, said non-movable means for receiving, carrying, holding, and allowing a release of said staple consisting of a slot formed in said each opposed sidewall and communicating with said floor for receiving and frictionally holding said staple, and magnet means in said floor cooperating with said slot in said each opposed sidewall for holding said staple in said recessed area.

2. A tool of claim 1, wherein said elongated body member is in a rod-like configuration, and wherein said striking surface and said staple carrying means have a diameter greater than that of said body member.

3. A tool of claim 1, wherein said elongated body member has a bent area adjacent to said staple carrying means for angularly positioning said tool relative to said working surface.

4. An elongated tool for driving an electrical staple and the like into a working surface in the operation of said tool in order to mount an electrical cablelike member onto said working surface, said tool being used with an instrument for imparting a pounding force against said tool for said driving of said staple, said tool comprising:

an elongated body member having a hand gripping area and a longitudinal axis, a striking surface forming a part of said body member at one end thereof for receiving said pounding force, staple carrying means formed at the other end of said body member for carrying said staple, said staple carrying means having two opposed sidewalls, a floor surface fixedly connected to said sidewalls and extending therebetween, and stop surfaces on said sidewalls extending in a plane parallel to that of said floor surface for limiting the depth of said staple when driven into said working surface, said sidewalls and said floor surface defining a recessed area with a passageway extending perpendicular to said axis of said body member, and having permanently fixed, nonmovable means associated with said passageway for receiving, carrying, holding, and freely allowing a release of said staple from said passageway, said passageway having a depth being greater than the thickness of said cable-like member being mounted onto said working surface, said passageway further being characterized as being open and unobstructed at all times such as to have a clear view therethrough during said operation of said tool as to allow said recessed area and said staple in said recessed area to freely receive said cable-like member in said driving of said staple into said working surface, with said fixed, non-movable means of said recessed area being in a non-contacting relationship with said cable-like member, thereby preventing damage from occurring to said cable-like member, and whereby said staple is driven into said working surface and is released from said recessed area of said tool by moving said tool away from said working surface without any relative movement occurring between said fixed, non-movable means associated with said open passageway of said recessed area and said elongated tool, said non-movable means for receiving, carrying, holding, and allowing a release of said staple consisting of a slot formed in said each opposed sidewall and communicating with said floor for receiving and frictionally holding said staple, and magnet means in said floor cooperating with said slot in said each opposed sidewall for holding said staple in said recessed area.

5. A tool a claim 4, wherein said elongated body member is in a rod-like configuration, and wherein said striking surface and said staple carrying means have a diameter greater than that of said body member.

6. A tool of claim 4, wherein said elongated body member has a bent area adjacent to said staple carrying means for angularly positioning said tool relative to said working surface.

* * * * *